(12) United States Patent
Seshadri

(10) Patent No.: US 10,785,648 B2
(45) Date of Patent: Sep. 22, 2020

(54) USER AUTHENTICATION IN WIRELESS ACCESS NETWORK

(71) Applicant: NOKIA SOLUTIONS AND NETWORKS OY, Espoo (FI)

(72) Inventor: Veera Raghavan Seshadri, Chennai (IN)

(73) Assignee: NOKIA SOLUTIONS AND NETWORKS OY, Espoo (FI)

( * ) Notice: Subject to any disclaimer, the term of this patent is extended or adjusted under 35 U.S.C. 154(b) by 0 days.

(21) Appl. No.: 16/616,253

(22) PCT Filed: Jun. 1, 2017

(86) PCT No.: PCT/EP2017/063320
§ 371 (c)(1),
(2) Date: Nov. 22, 2019

(87) PCT Pub. No.: WO2018/219462
PCT Pub. Date: Dec. 6, 2018

(65) Prior Publication Data
US 2020/0107193 A1 Apr. 2, 2020

(51) Int. Cl.
*H04W 12/06* (2009.01)
*H04L 29/06* (2006.01)
*H04W 8/04* (2009.01)
*H04W 8/08* (2009.01)
*H04W 8/24* (2009.01)
(Continued)

(52) U.S. Cl.
CPC ............ *H04W 12/06* (2013.01); *G06F 21/32* (2013.01); *H04L 9/0894* (2013.01); *H04L 63/0861* (2013.01); *H04W 8/04* (2013.01); *H04W 8/08* (2013.01); *H04W 8/245* (2013.01); *H04W 12/0608* (2019.01); *H04W 12/0804* (2019.01); *H04W 60/00* (2013.01)

(58) Field of Classification Search
None
See application file for complete search history.

(56) References Cited

U.S. PATENT DOCUMENTS 7,548,981 B1    6/2009  Taylor et al.
2003/0204732 A1*  10/2003  Audebert .............. H04L 9/3226
                                                    713/182
(Continued)

OTHER PUBLICATIONS

International Search Report & Written Opinion dated Feb. 15, 2018 corresponding to International Patent Application No. PCT/EP2017/063320.

(Continued)

*Primary Examiner* — Saleh Najjar
*Assistant Examiner* — Michael W Chao
(74) *Attorney, Agent, or Firm* — Squire Patton Boggs (US) LLP

(57) ABSTRACT

This document discloses a solution for enabling biometric authentication of a station. According to an aspect, the solution comprises transmitting, from the station, a trigger to include biometric data of a user of the station in authentication; a logic at a network node to handle the trigger and cause execution of an authentication procedure that employs the biometric data when performing said authentication procedure in a wireless access network; and indicating a result of the authentication to the station.

12 Claims, 6 Drawing Sheets

(51) Int. Cl.
*G06F 21/32* (2013.01)
*H04W 12/08* (2009.01)
*H04L 9/08* (2006.01)
*H04W 60/00* (2009.01)

(56) References Cited

U.S. PATENT DOCUMENTS

| | | | | |
|---|---|---|---|---|
| 2004/0034783 | A1* | 2/2004 | Fedronic | G06F 21/32 713/186 |
| 2004/0210771 | A1* | 10/2004 | Wood | G06F 21/31 726/8 |
| 2007/0094509 | A1* | 4/2007 | Wei | H04L 9/3231 713/176 |
| 2007/0253624 | A1* | 11/2007 | Becker | G06K 9/00885 382/225 |
| 2008/0159598 | A1* | 7/2008 | Iasso | G06K 9/00885 382/115 |
| 2009/0183247 | A1* | 7/2009 | Kasper | H04L 63/0861 726/7 |
| 2010/0191967 | A1* | 7/2010 | Fujii | H04L 63/0861 713/169 |
| 2012/0015657 | A1* | 1/2012 | Comsa | H04W 52/0206 455/436 |
| 2012/0087549 | A1* | 4/2012 | Benini | G06K 9/00892 382/115 |
| 2013/0051630 | A1* | 2/2013 | Marques | G06K 9/6857 382/117 |
| 2013/0227664 | A1* | 8/2013 | McKay | H04L 9/3231 726/7 |
| 2014/0016628 | A1* | 1/2014 | McCann | H04L 63/0823 370/338 |
| 2014/0119353 | A1* | 5/2014 | McCann | H04W 76/12 370/338 |
| 2016/0087957 | A1* | 3/2016 | Shah | H04W 12/06 726/1 |
| 2016/0226867 | A1* | 8/2016 | Harding | H04L 63/0861 |
| 2016/0330198 | A1* | 11/2016 | Stern | G06F 16/9535 |
| 2017/0070881 | A1* | 3/2017 | Sun | H04L 63/08 |
| 2017/0094700 | A1* | 3/2017 | Hong | H04W 76/12 |
| 2017/0102970 | A1* | 4/2017 | Kolk | G06F 21/32 |
| 2018/0167386 | A1* | 6/2018 | Bhatt | H04L 63/0861 |
| 2018/0183855 | A1* | 6/2018 | Sabella | H04L 67/04 |
| 2019/0260608 | A1* | 8/2019 | Baboescu | H04L 12/4633 |
| 2020/0042685 | A1* | 2/2020 | Tussy | G06K 9/00912 |

OTHER PUBLICATIONS

Written Opinion of the International Preliminary Examining Authority dated May 14, 2019 corresponding to International Patent Application No. PCT/EP2017/063320.

International Preliminary Report on Patentability dated Jul. 25, 2019 corresponding to International Patent Application No. PCT/EP2017/063320.

* cited by examiner

FIG 5
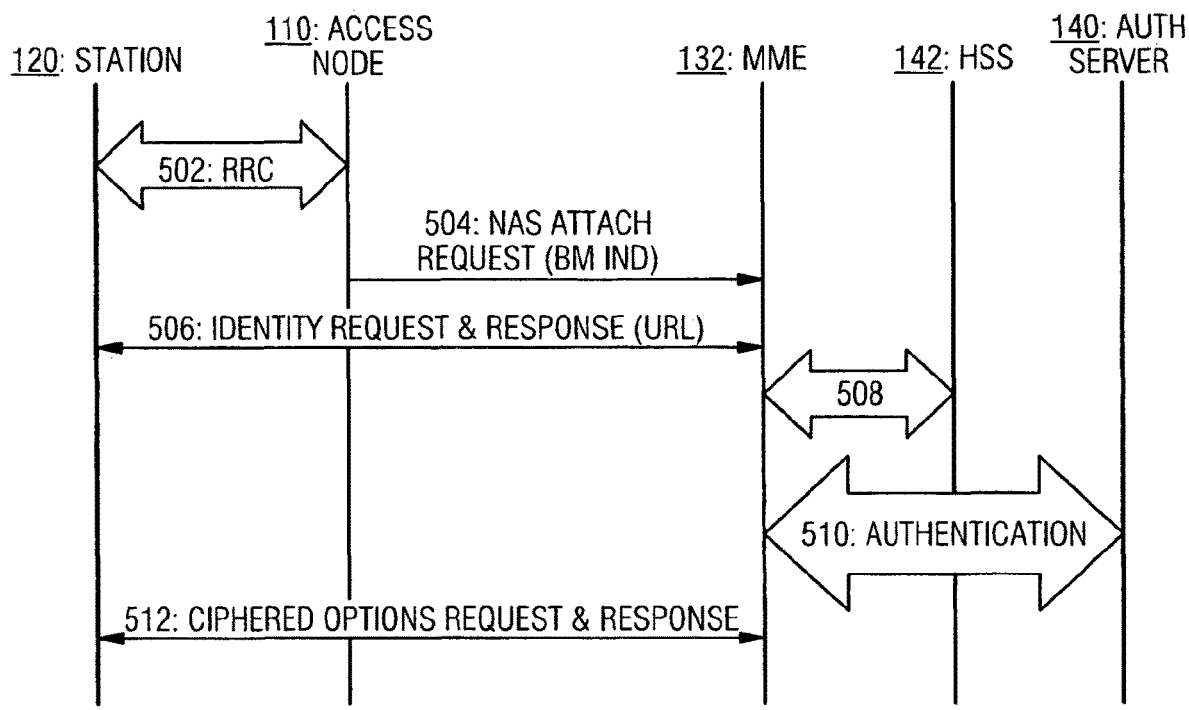
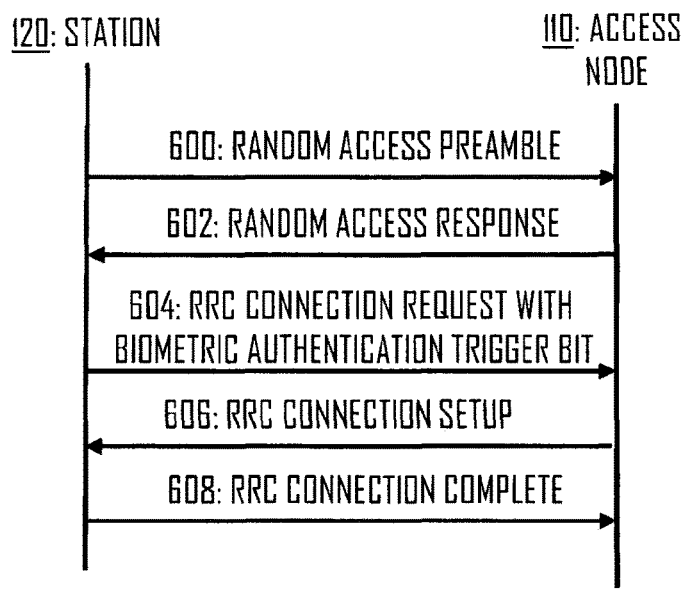
Fig 6

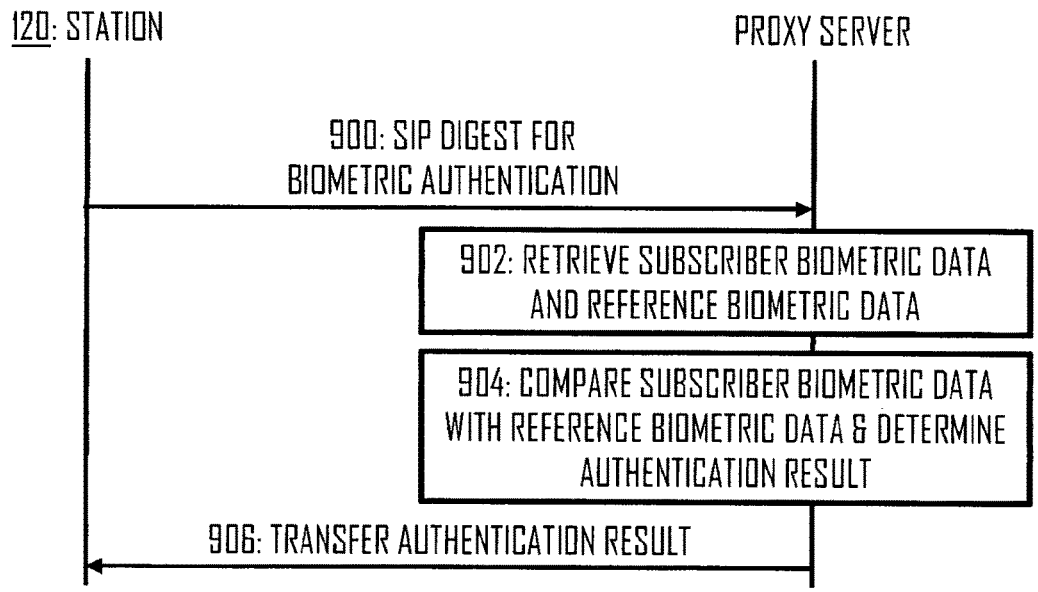
Fig 9
FIG 10
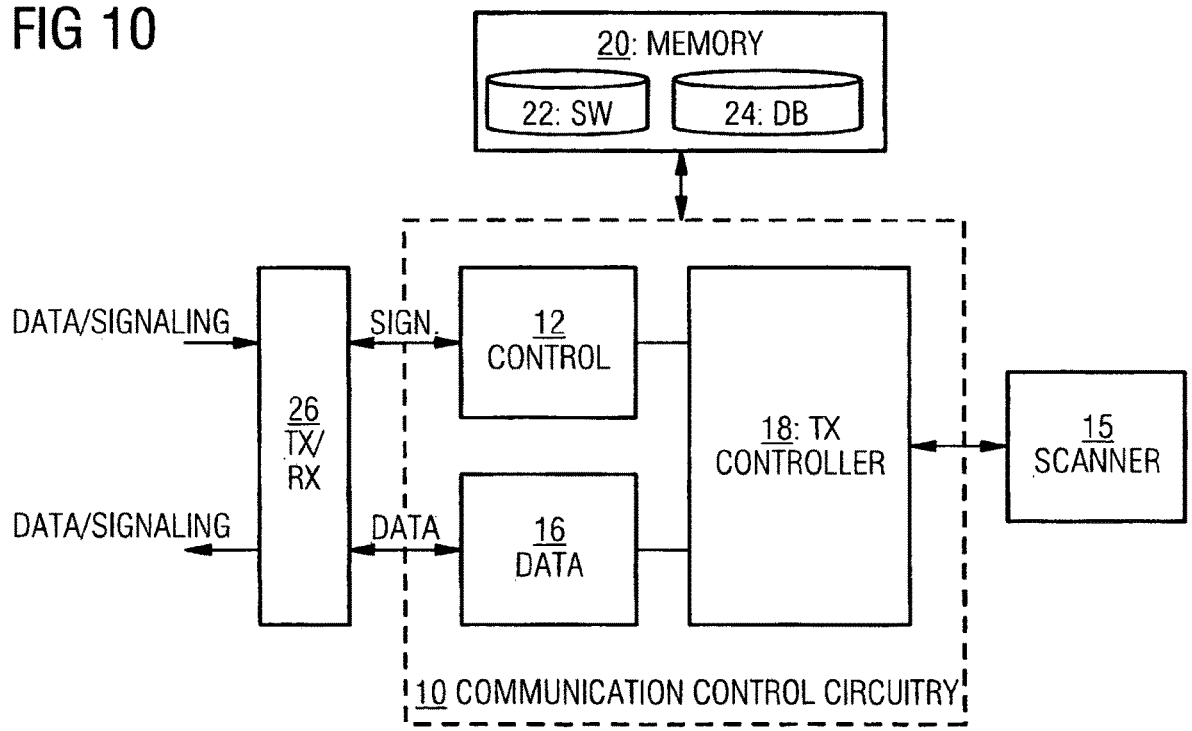

USER AUTHENTICATION IN WIRELESS ACCESS NETWORK

FIELD

The invention relates to user authentication in a wireless network.

BACKGROUND

Network access for a station is typically managed by a network access provider. The network access provider may provide a network infrastructure or utilize a network infrastructure of a network operator, such as an incumbent cellular communication system operator, a local cable television service, or a wireless services operator in modern communication solutions. The network infrastructure typically comprises one or more access nodes providing the station with wireless connectivity. The access node(s) may then connect to other parts of the network infrastructure such as a core network, and to other networks such as the Internet.

When negotiating the access to the network infrastructure for a particular end user or User Entity (UE) or subscriber, all referring to the same entity, authentication is the first process that provides a solution for identifying a user, typically by validating user credentials before granting the station with access to the access node(s). The process of authentication is based on each user having a unique piece of information, a username-password combination, a system identifier, or a secret key that serves as unambiguous identification credentials.

BRIEF DESCRIPTION OF THE INVENTION

The invention is defined by the subject-matter of the independent claims. Embodiments are defined in the dependent claims.

LIST OF DRAWINGS

In the following, the invention will be described in greater detail with reference to the embodiments and the accompanying drawings, in which FIG. 1 illustrates a wireless access network to which embodiments of the invention may be applied;

FIG. 5 illustrates a signaling diagram for carrying out connection establishment and associated authentication according to an embodiment of the invention FIG. 6 illustrates a radio connection establishment procedure employing a mechanism to trigger biometric authentication according to an embodiment of the invention;

FIG. 9 illustrates a signaling diagram for performing biometric authentication in connection with a session initiation protocol according to an embodiment of the invention; and FIGS. 10 and 11 illustrate block diagrams of apparatuses according to some embodiments of the invention.

DESCRIPTION OF EMBODIMENTS

Figure 1:
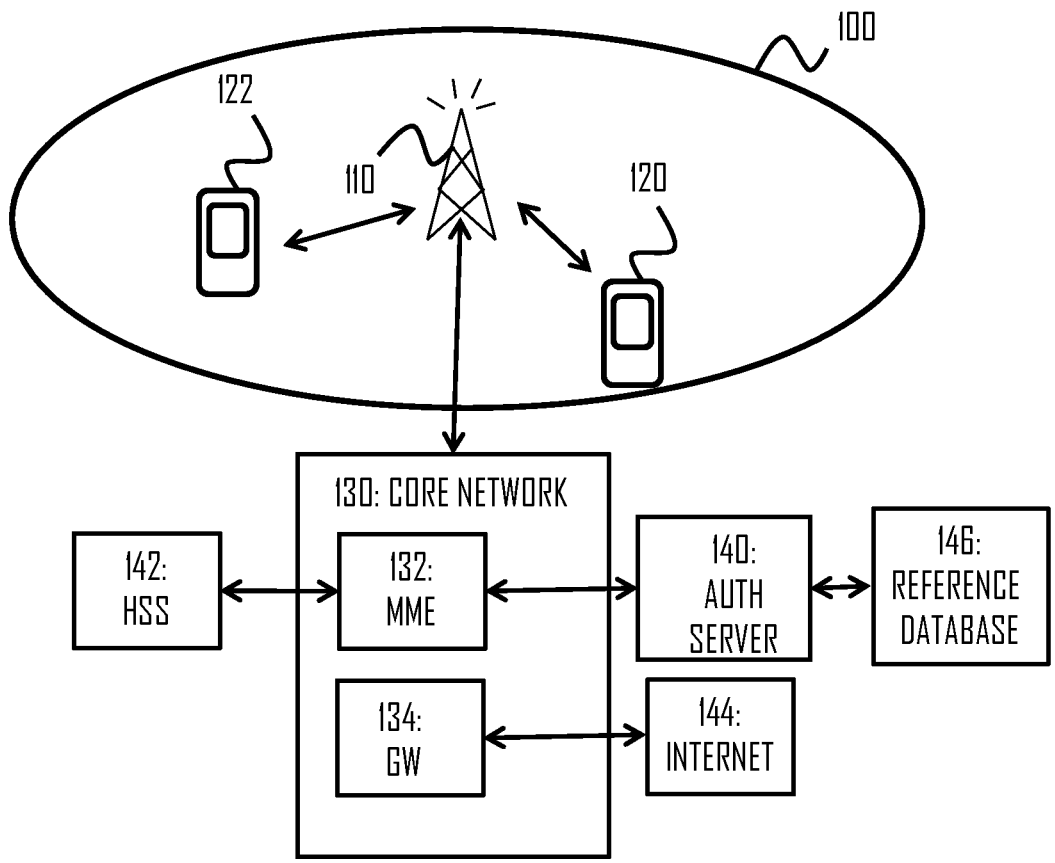

The following embodiments are exemplifying. Although the specification may refer to "an", "one", or "some" embodiment(s) in several locations of the text, this does not necessarily mean that each reference is made to the same embodiment(s), or that a particular feature only applies to a single embodiment. Single features of different embodiments may also be combined to provide other embodiments.

Embodiments described may be implemented in a radio system, such as in at least one of the following: Universal Mobile Telecommunication System (UMTS, 3G) based on basic wideband-code division multiple access (W-CDMA), high-speed packet access (HSPA), Long Term Evolution (LTE), LTE-Advanced, a system based on IEEE 802.11 specifications, a system based on IEEE 802.15 specifications, and/or a fifth generation (5G) mobile or cellular communication system The embodiments are not, however, restricted to the system given as an example but a person skilled in the art may apply the solution to other communication systems provided with necessary properties. One example of a suitable communications system is the 5G system, as listed above. 5G has been envisaged to use multiple-input-multiple-output (MIMO) multi-antenna transmission techniques, more base stations or nodes than the current network deployments of LTE, by using a so-called small cell concept including macro sites operating in co-operation with smaller local area access nodes and perhaps also employing a variety of radio technologies for better coverage and enhanced data rates. 5G will likely be comprised of more than one radio access technology (RAT), each optimized for certain use cases and/or spectrum. 5G system may also incorporate both cellular (3GPP) and non-cellular (e.g. IEEE) technologies. 5G mobile communications will have a wider range of use cases and related applications including video streaming, augmented reality, different ways of data sharing and various forms of machine type applications, including vehicular safety, different sensors and real-time control. 5G is expected to have multiple radio interfaces, including apart from earlier deployed frequencies below 6 GHz, also higher, that is cmWave and mmWave frequencies, and also being capable of integrating with existing legacy radio access technologies, such as the LTE. Integration with the LTE may be implemented, at least in the early phase, as a system, where macro coverage is provided by the LTE and 5G radio interface access comes from small cells by aggregation to the LTE. In other words, 5G is planned to support both inter-RAT operability (such as LTE-5G) and inter-RI operability (inter-radio interface operability, such as inter-RI operability between cmWave and mmWave). One of the concepts considered to be used in 5G networks is network slicing in which multiple independent and dedicated virtual sub-networks (network instances) may be created within the same infrastructure to run services that have different requirements on latency, reliability, throughput and mobility.

It should be appreciated that future networks will most probably utilize network functions virtualization (NFV) which is a network architecture concept that proposes virtualizing network node functions into "building blocks" or entities that may be operationally connected or linked together to provide services. A virtualized network function (VNF) may comprise one or more virtual machines running computer program codes using standard or general type servers instead of customized hardware. Cloud computing or cloud data storage may also be utilized. In radio communications this may mean node operations to be carried out, at least partly, in a server, host or node operationally coupled to a remote radio head. It is also possible that node operations will be distributed among a plurality of servers, nodes or hosts. It should also be understood that the distribution of labour between core network operations and base station operations may differ from that of the LTE or even be non-existent. Some other technology advancements probably to be used are Software-Defined Networking (SDN), Big Data, and all-IP, which may change the way networks are being constructed and managed.

FIG. 1 illustrates an example of a communication system to which some embodiments of the invention may be applied. The system may comprise one or more access nodes 110 providing and managing respective cells 100. The cell 100 may be, e.g., a macro cell, a micro cell, femto, or a pico cell, for example. From another point of view, the cell may define a coverage area or a service area of the access node. The access node 110 may be an evolved Node B (eNB) as in the LTE and LTE-A, an access point of an IEEE 802.11-based network (Wi-Fi or wireless local area network, WLAN), or any other apparatus capable of controlling radio communication and managing radio resources within a cell. For 5G solutions, the implementation may be similar to LTE-A, as described above. The access node may equally be called a base station or a network node. The system may be a wireless communication system composed of a radio access network of access nodes, each controlling a respective cell or cells. The access nodes may provide terminal devices (UEs) 120, 122 with wireless access to other networks such as the Internet. The terminal device 120, 122 may also be called a station, as in the description below. In some scenarios, one or more local area access nodes may be arranged within a control area of a macro cell access node. The local area access node may provide wireless access within a sub-cell that may be comprised within a macro cell. Examples of the sub-cell may include a micro, pico and/or femto cell. Typically, the sub-cell provides a hot spot within the macro cell. The operation of the local area access node may be controlled by an access node under whose control area the sub-cell is provided. In some scenarios, a plurality of local area access nodes may be controlled by a single macro cell access node.

The wireless access network of FIG. 1 may be employed by other networks such as an internet protocol multimedia subsystem (IMS) or services such as voice over LTE (VoLTE).

In the case of multiple access nodes in the communication network, the access nodes may be connected to each other with an interface. LTE specifications call such an interface as X2 interface. In IEEE 802.11 networks, a similar interface is provided between access points. An LTE access node and a WLAN access node may be connected, for example via Xw interface. Other wired or wireless communication methods between the access nodes may also be possible. The access nodes may be further connected via another interface to a core network 130 of the cellular communication system. The LTE specifications specify the core network as an evolved packet core (EPC), and the core network may comprise a mobility management entity (MME) 132, and a gateway (GW) node 134. The MME 132 may handle mobility of terminal devices in a tracking area encompassing a plurality of cells and also handle signalling connections between the terminal devices and the core network 130. The MME 132 may further carry out authentication and integrity protection for terminal devices 120, 122. The gateway node 134 may handle data routing in the core network 130 and to/from the terminal devices. In an embodiment, the gateway node is replaced by a group of gateway nodes, such as in the LTE networks. In the LTE networks, a serving gateway (SGW) node is configured to assign a suitable packet data network gateway (PGW) for the station 120,122 to serve a data session. The gateway node 134 may connect to other communication networks such as the Internet 144.

The radio system of FIG. 1 may support Machine Type Communication (MTC). MTC may enable providing service for a large amount of MTC capable devices, such as the at least one terminal device 120, 122. The at least one terminal device 120, 122 may comprise a mobile phone, smart phone, tablet computer, laptop or other devices used for user communication with the radio communication network, such as an MTC network. These devices may provide further functionality compared to the MTC scheme, such as communication link for voice, video and/or data transfer. However, in MTC perspective the at least one terminal device 120, 122 may be understood as a MTC device. It needs to be understood that the at least one terminal device 120, 122 may also comprise another MTC capable device, such as a sensor device providing position, acceleration and/or temperature information to name a few examples. Some embodiments of the invention may thus be applicable to Internet of Things (IoT) systems, e.g. a radio access technology supporting a narrowband IoT (NB-IoT) communication scheme.

FIG. 1 illustrates an infrastructure-based communication scenario with a fixed access node 110 providing a mobile terminal device 120, 122 with radio access. Another perspective in wireless communications involves wireless links between mobile devices. In a context, the devices 120, 122 may be peer devices in the sense that the devices 120, 122 may be end points of a wireless connection and establish a local peer network. In another scheme, one of the devices 120 may provide the other device 120 with wireless access to the infrastructure. Accordingly, the device providing the access may be understood as a mobile access node. Such a scheme is sometimes called tethering.

The core network 130 and a network of access nodes 110 may form a wireless access network providing the terminal devices 120, 122 with wireless access and data transfer capability with the other networks 144. In order to provide the wireless access, the wireless access network may first establish a connection with the terminal device 120. The connection establishment may include establishment of a radio connection such as a radio resource control (RRC) connection between the access node 110 and the terminal device and, furthermore, it may include establishment of a core network connection between the core network 130 and the terminal device. The connection establishment may include authentication of the terminal device. The authentication may be performed by the MME 132, a dedicated authentication server 140 or, in general, any network node of the wireless access network capable of performing the authentication. In some embodiments, the authentication server is external to the wireless access network. Accordingly, resource consumption or overloading the core network regarding the authentication may be reduced. The authentication may utilize a reference database 146 storing user credentials that have been authorized to access the wireless access network.

The wireless access network may further comprise a home subscriber server (HSS) 142 storing information on subscribers. In the LTE system, the HSS combines a home location register (HLR) and an authentication center (AuC) which means that the elements 140, 142 may be combined into a single network element. The HLR part of the HSS 142 stores and maintains user subscription information, including: user identification and addressing information such as International Mobile Subscriber Identity (IMSI) and Mobile Subscriber ISDN Number (MSISDN) or a mobile telephone number of the subscriber; and user profile information such as service subscription states and user-subscribed Quality of Service information (such as maximum allowed bit rate or allowed traffic class). The AuC part of the HSS 142 is in charge of generating security information from user identity keys. This security information is provided to the HLR and further communicated to other entities in the network. Security information is mainly used for authentication, ciphering and integrity protection to ensure data and signalling transmitted between the wireless access network and the terminal device is secured.

Conventional authentication mechanisms utilize identity information stored in the terminal device 120, 122, e.g. on a subscriber identity module (SIM) of the terminal device 120, 122. The identity information may include a globally unique subscriber identifier such as International Mobile Subscriber Identity (IMSI) of the LTE system. Other authentication mechanisms may involve a combination of a user name and a password as means for authentication a subscriber or a station. Other mechanisms may involve input of a secret password from the station.

Figure 2:
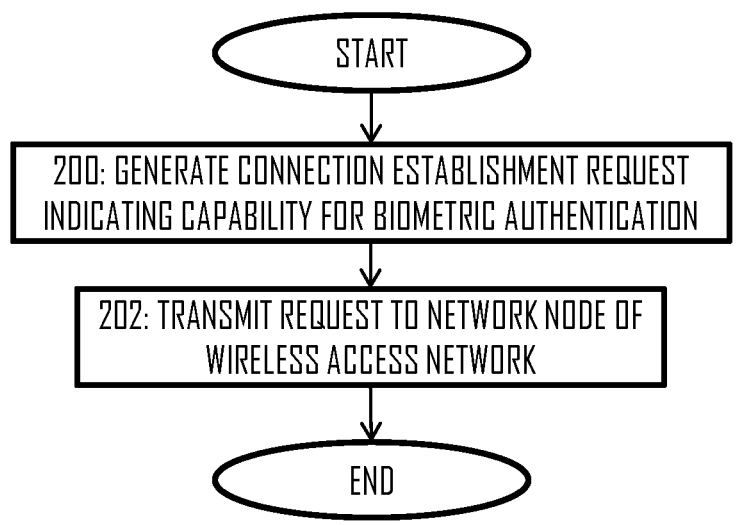
FIGS. 2 and 3 illustrate flow diagrams of processes for enabling biometric subscriber authentication according to some embodiments of the invention.
Figure 3:
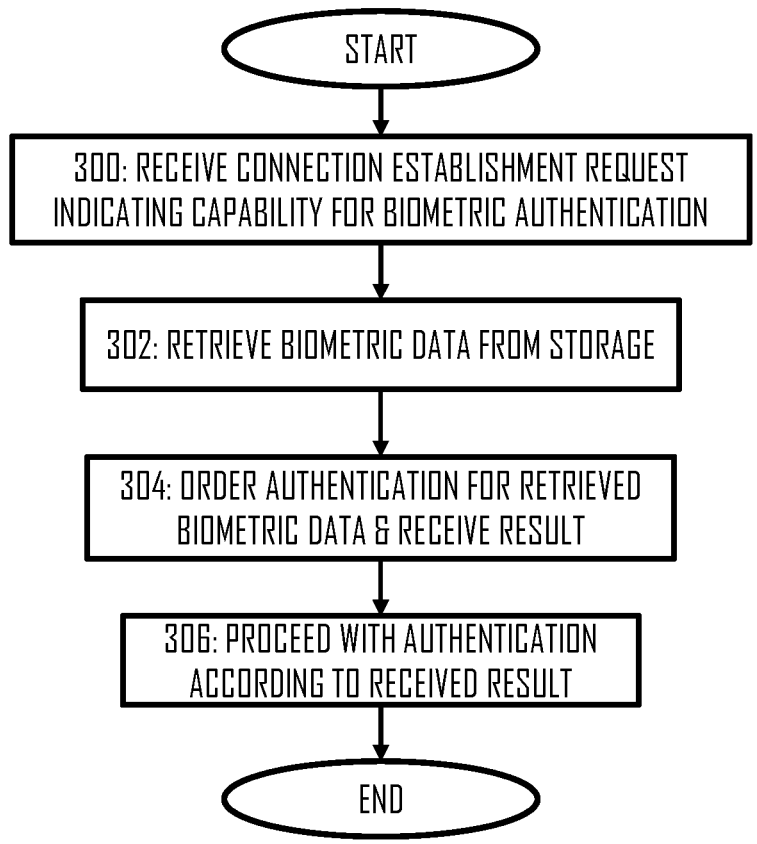

Some embodiments of the invention enable authentication in connection with the wireless access based on utilizing biometric data of a user of the station in the authentication. FIGS. 2 and 3 illustrate flow diagrams of processes for enabling the biometric-data-based authentication in the wireless access network. FIG. 2 illustrates a procedure performed by the station 120 or 122. Referring to FIG. 2, the process comprises as performed by the station: generating (block 200) a connection establishment request comprising at least one information element indicating capability of the user device 120 or 122 using biometric data in an authentication procedure in a wireless access network; and transmitting (block 202) the connection establishment request to a network node of the wireless access network.

FIG. 2 illustrates a process where the station is configured to indicate the capability for using the biometric data in the authentication to the network node. In an embodiment, the network node is the access node 110. In another embodiment, the network node is the MME 132 or a similar node establishing the core network connection for the station 120, 122.

FIG. 3 illustrates a process performed by the network node. Referring to FIG. 3, the process comprises: receiving (block 300) the connection establishment request for connection establishment for the station. As described in connection with FIG. 2, the connection establishment request comprises at least one information element indicating capability of using biometric data in an authentication procedure of the connection establishment. The method further comprises: determining a network element of the wireless access network storing the biometric data and retrieving (block 302) the biometric data from the determined network element; transmitting (block 304) an authentication request to authenticate the retrieved biometric data to an authentication node having access to a reference database storing reference biometric data; receiving (block 304), from the authentication node as a response to the authentication request, an authentication result; and proceeding (block 306) with the connection establishment for the station on the basis of the received authentication result.

Figure 4:
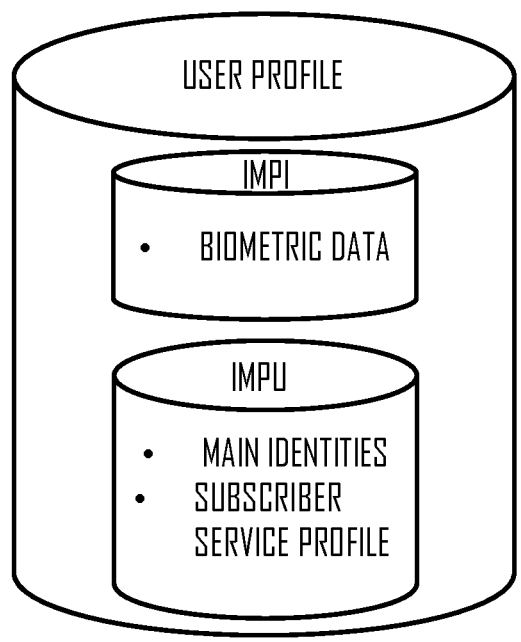
FIG. 4 illustrates a user profile stored in a network element together with biometric data of a subscriber according to an embodiment of the invention.

The network element storing the biometric data of a user of the station may be the HSS 142. As described above, the HSS may store various information on subscribers. Regarding the station described in connection with the FIGS. 2 and 3, the HSS 142 may store one or more identifiers of the station, contact details of the station, etc. FIG. 4 illustrates an embodiment of a record of a user profile associated with the station at the HSS 142. Referring to FIG. 4, the user profile may store an internet protocol (IP) multimedia private identity (IMPI) of a subscriber associated with the station and IP multimedia public identity (IMPU) of the subscriber. The IMPI may be defined as a permanently allocated global identity assigned by the home network operator. The IMPI may be a network access identifier in the form of an e-mail address, for example, and it may be used registration, authentication, authorization, administration, and accounting purposes.

The authentication has already been discussed above. Following the authentication, the authorization process defines rights and services the subscriber is allowed once the network access is granted. The authorization constitutes an ability to use certain types of services like IP address filtering, address assignments, route assignment, QoS/differential services, bandwidth control, traffic management, compulsory tunneling to a specific endpoint, encryption, and so on. Accounting is used to measure resources the subscriber consumes during access. Accounting may be carried out by logging session statistics of a service utilizing the wireless access and usage information.

In an embodiment, the HSS 142 stores biometric data of the subscriber as mapped to the IMPI. The biometric data may comprise definitions of a scanned finger print of the subscriber, definitions of a scanned retina of the subscriber, a recorded voice sample of the subscriber, or another biometric data measured, scanned or recorded from the subscriber and not restricted only to these types mentioned here. The biometric data may be recorded in the HSS when the user purchases the services, e.g. a mobile connection subscription. At the same instance, a memory of the SIM of the station may be updated with information that the biometric data of the user has been recorded and is available for use in the authentication. In another embodiment, the station 120, 122 is configured with a capability of transporting this biometric data when during the connection establishment. For example, the wireless access network may open a data channel to the station 120, 122 specifically for transmitting the biometric data. As a consequence, the station housing the SIM is capable of discerning in the process of FIG. 2 that the authentication based on the biometric data has been enabled. In connection with block 200, the station may check the memory of the SIM whether or not the biometric data has been recorded and, if the memory stores information that the recording of the biometric data has been made, the station may proceed with block 200 and 202.

The subscriber may be considered as the primary user of the station, e.g. a user with which the wireless access network associates a SIM of the station.

If there is no biometric trigger part of the connection request, then the wireless access network may carry out conventional authentication. The IMPU may be used by any user for requesting communications to other users. The user profile of the HSS 142 may store, as mapped to the IMPU, a telephone number of the subscriber or other contact details of the subscriber. Other contact details may include a session initiation protocol (SIP) contact details such as "SIP:

user@domain" or "SIP:E.164@domain". The user profile may further store, in connection with the IMPU, a list of communication services the subscriber has available.

The processes of FIGS. 2 and 3 are inter-related in the sense that they address the same concept of enabling the authentication by utilizing biometric data in connection with a connection establishment process for the station. FIG. 5 illustrates a signalling diagram of a procedure for carrying out the connection establishment for the station 120. The procedure involves signalling comprising features of the authentication by using the biometric data.

Referring to FIG. 5, the connection establishment comprises a procedure for establishing a radio resource control (RRC) connection between the access node 110 and the station 120 in block 502. The details of the RRC connection establishment are described below in connection with FIG. 6. In an embodiment, the station 120 indicates the capability for the authentication based on the biometric data to the access node 110 in block 502. When the RRC connection has been established, the access node 110 may transmit or forward an attach request to the MME 132 (step 504). The attach request may be a non-access stratum (NAS) message. The attach request may comprise an indicator indicating the capability for the authentication based on the biometric data to the MME 132.

In an embodiment, the information element indicating the capability for the authentication based on the biometric data is a flag or another short message only indicating said capability in block 502 and/or 504. The information element may be a one-bit indicator. Upon receiving the attach request in step 504, the MME 132 may detect that the authentication based on the biometric data has been triggered and, as a response, the MME may include in a subsequent identity request message a request for providing the biometric data. In step 506, the MME transmits the identity request message to the station 120 through the access node 110 and over the established RRC connection. In response to the identity request, the station 120 may generate an identity response message and insert into the identity response message a resource locator element indicating a network resource storing the biometric data. As described above, the biometric data may have been stored beforehand in the HSS or another network element. The network location such as a network address of the network element may also be stored in the station 120 beforehand. Accordingly, the station 120 is capable of inserting the resource locator element indicating the network resource to the identity response message.

In an embodiment, the resource locator element is a uniform resource locator (URL).

Upon receiving the identity response message in step 506 and determining the network location of the biometric data from the identity response message, the MME may retrieve the biometric data from the network location, e.g. the HSS 142, in a procedure of block 508. In an embodiment, the retrieval in block 508 is performed according to Diameter protocol described in greater detail in connection with FIG. 7 below.

Figure 8:
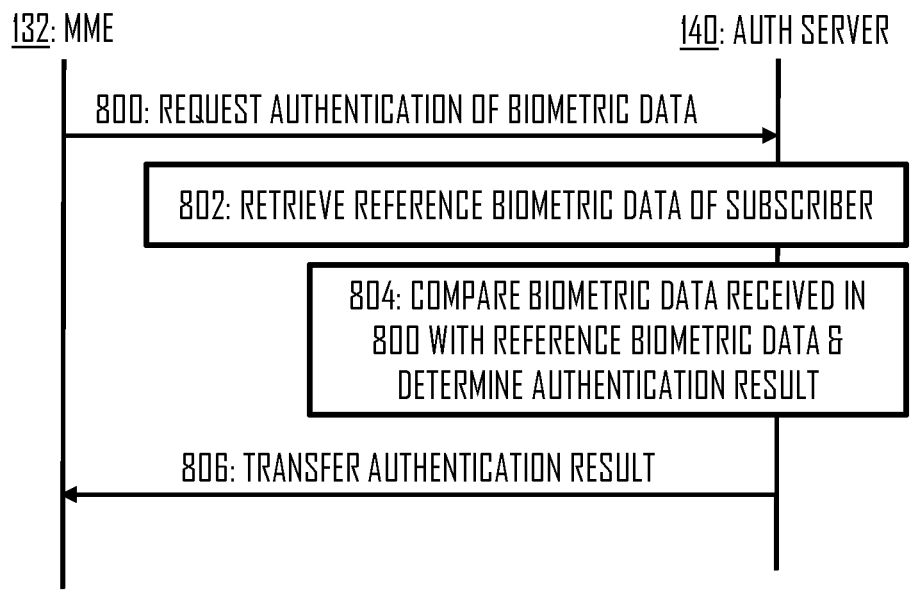
FIG. 8 illustrates a signaling diagram for performing authentication according to an embodiment of the invention.

Upon retrieving the biometric data of the subscriber of the station 120 in block 508, the MME 132 may carry out the authentication in block 510. In block 510, the MME 132 may order the authentication server 140 to authenticate the retrieved biometric data. Details of this procedure are described in connection with FIG. 8 below.

The authentication server 140 may be connected to a reference database serving as a repository for authorized reference biometric data. The reference database may be maintained by a regulatory authority that has access to biometric data collected from citizens. As known, many countries have an official digital database storing biometric identities of the citizens. The authentication server may access such a database and acquire the reference biometric data for the authentication. Upon receiving the biometric data of the subscriber from the MME and the reference biometric data from the reference database, the authentication server may compare the biometric data and output the result of the authentication to the MME 132. Thereafter, the MME 132 may proceed with the establishment of the core network connection of the station in step 512. For example, if the authentication was successful, the MME may proceed by transmitting a ciphered options request to the station 120 in step 512 and receiving a corresponding response. When the authentication is failed, corresponding actions may be carried out according to the standard procedures.

If fetching the subscriber's biometric data fails, the MME 132 may decide to perform the conventional, non-biometric-data-based authentication and complete the authentication process in the conventional manner.

In the embodiment of FIG. 5, the station 120 sends the trigger or flag indicating the capability for using the biometric data in the authentication in step 502 and, subsequently in step 506, the station 120 sends the resource location of the biometric data.

In another embodiment, the station 120 transmits also the resource location of the biometric data in step 502. Accordingly, step 506 may be carried out in a conventional manner. The access node 110 may then forward the resource location of the biometric data to the MME 132 in step 504. In both embodiments, there is no need to send the biometric data from the station 120 because the biometric data has been recorded and stored in the wireless access network beforehand.

Let us now describe how the indicator indicating the capability for the authentication based on the biometric data is applied to the RRC connection establishment procedure. FIG. 6 illustrates a signalling diagram of the RRC connection establishment procedure between the station 120 and the access node 110. Referring to FIG. 6, the RRC connection establishment procedure may start in a conventional manner in steps 600 and 602 where the station transmits a random access preamble to the access node 110 (step 600) and receives a random access response (Step 602) from the access node 110. The random access response may include allocation of an uplink resource for a subsequent RRC connection request. In step 604, the station transmits the RRC connection request, and the request may comprise the above-described information element that indicates the capability for the authentication by using the biometric data of the subscriber of the station 120.

In an embodiment, a spare bit of a RRC connection request frame is used to indicate the capability. The RRC connection request may have the following form: UL-CCCH-Message

```
rrcConnectionRequest
   message=c1=rrcConnectionRequest=
       criticalExtensions=rrcConnectionRequest-r8=
       ue-Identity=s-TMSI=
       mmec=00000001
       m-TMSI=0001001000110100010101011001111000
       establishmentCaus=mo-Signalling
       spare=[0/1]
```

Above, the value of "spare" may indicate the capability, e.g. value "0" indicates no capability for using the biometric data and value "1" indicates the capability for using the biometric data but not restricted only to this logic. Some other possible available bit can also be used to implement this logic.

Upon receiving the RRC connection request in step 604, the access node may proceed with the RRC connection establishment in a conventional manner in steps 606 and 608 where the RRC connection establishment is completed. As described above in connection with step 504, the access node may use the information element received in step 604 to indicate the capability for the biometric-data-based authentication to the MME in the attach request.

Figure 7:
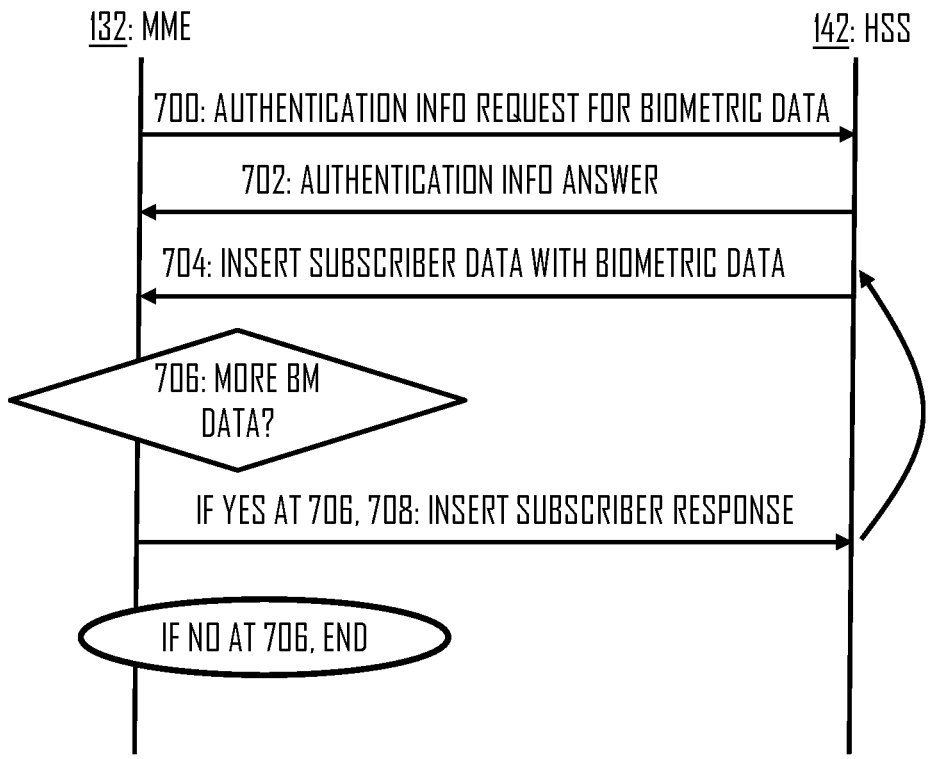
FIG. 7 illustrates a signaling diagram for retrieving biometric data for authentication according to an embodiment of the invention.

When the MME has the knowledge the biometric data can be used in the authentication and, further, has the knowledge about the location of the biometric data, e.g. an address to the corresponding HSS 142, the MME may initiate retrieval of the biometric data. FIG. 7 illustrates a procedure for retrieving the biometric data. The embodiment of FIG. 7 describes implementation of the retrieval according to Diameter protocol. Diameter protocol is an application layer protocol for authentication, authorization and accounting in computer networks, and belongs to the set of protocols according to transport control protocol/internet protocol (TCP/IP). The communication in FIG. 7 may be carried out over S6a or S6d interface between the MME 132 and the HSS 142.

As described above, the biometric data of the user may be stored in the network element such as the HSS during registration of the subscriber to the wireless access network, e.g. when selling the SIM and associated services to the user. The network element may be accessible to all network nodes of the wireless access network such that the biometric data can be retrieved for the authentication purposes, for example. Referring to FIG. 7, let us now describe an embodiment of block 508 of FIG. 5. In step 700, the MME 132 or, in other embodiments, another network node of the wireless access network transmits an authentication-information-request (AIR) message (Attribute Value Pair (AVP) code 318) to the HSS 142. The AIR may carry an information element indicating that the MME 132 requests specifically for biometric data for the authentication. Upon receiving the AIR in step 700, the HSS 142 generates an authentication-information-answer (AIA) message (message code 318) that responds to the AIR. The AIA may comprise an acknowledgement of the request and a reference to a following message that will carry the biometric data. The HSS 142 transmits the AIA message in step 702. Upon receiving the AIA message in step 702, the MME extracts the information on the reference to the following message and starts to wait for the referred following message. In step 704, the HSS can use insert subscriber data (ISD) message to transmit the biometric data of the user if needed Upon receiving the biometric data in step 704, the MME 132 may extract the biometric data and determine in block 706 whether or not further biometric data is needed. Upon determining that the received biometric data is sufficient for the authentication, the process may end. However, upon determining in block 706 that the received biometric data is incomplete or that further biometric data is needed, the MME 132 may trigger transmission of further biometric data by transmitting an insert subscriber response (ISR) message to the HSS 142 in step 708. Upon receiving the ISR message in step 708, the HSS may retrieve further biometric data from its memory or repository and return to step 704 again by transmitting the further biometric data to the MME 132. In this manner, the procedure may stay in the loop of steps 704 to 708 until the MME 132 determines to have completed the retrieval of the biometric data needed for the authentication. This is one possible method of implementation in seeking biometric data for the authentication process and not restricted to it.

Upon receiving the biometric data of the subscriber for the authentication, the MME 132 may order the authentication server 140 to carry out the authentication of the biometric data. An embodiment of this procedure of block 510 is described now with reference to FIG. 8. In step 800, the MME 132 transmits an authentication request to the authentication server 140. The authentication request may carry the biometric data retrieved from steps 740 till 708 according to any one of the above-described embodiments. Upon receiving the authentication request and the biometric data in step 800, the authentication server 140 may trigger an authentication process to verify authenticity of the received biometric data. In block 802, the authentication server 140 retrieves the above-described reference biometric data from a repository storing the reference biometric data. The authentication request may further carry subscriber credentials that identify the subscriber and enable the authentication server to retrieve the reference biometric data of the correct subscriber from the repository. Upon receiving the reference biometric data in block 802, the authentication server compares the biometric data received in step 800 with the reference biometric data retrieved in block 802 and determines an authentication result. If the authentication server determines in block 804 that the biometric data received in step 800 matches with the reference biometric data, the authentication is successfully complete, and the authentication server may transmit the authentication result indicating the verified authenticity of the biometric data to the MME 132 in step 806. On the other hand, if the authentication server determines in block 804 that the biometric data received in step 800 does not match with the reference biometric data, the authentication is failed, and the authentication server may transmit in step 806 an authentication result indicating the invalid authenticity of the biometric data to the MME 132.

If the authentication is successful and the biometric data authentic, the MME 132 may complete the attachment procedure and allow the station to access the wireless access network. The MME or another network element may also then proceed with the authorization and accounting procedures described above. If the authentication is failed and the biometric data invalid, the MME 132 may terminate the attachment procedure and indicate failed attachment to the station 120.

A similar process of blocks 800 to 806 can be adopted by a visited network, if the station is roaming and not attached to its home network. The process may be used for checking if the user is a black listed or not, or for another purpose. An example of the other purpose is an embodiment where the visiting network uses the process in providing personalised services.

In an embodiment where the core network does not support the biometric authentication, the MME 132 may respond to the attach request received in step 504 with a response message that indicates that the biometric authentication is not supported. In such a case, the network node controlling the authentication may carry out a conventional authentication procedure.

In an embodiment, the biometric authentication, authorization, and/or accounting is utilized in connection with a session initiation protocol (SIP), e.g. as a part of SIP registration. FIG. 9 illustrates an embodiment of the SIP registration procedure where biometric authentication is enabled. Referring to FIG. 9, a user agent such as the station 120 or an application executed in the station 120 or another electronic device transmits a SIP registration message to a server that may be a proxy server. The SIP registration message may comprise an information element indicating that the authentication/authorization/accounting based on the biometric data is available. The SIP registration message may further comprise a resource locator which is part of its message body called Session Descriptor Protocol (SDP) specifying a network location where the biometric data is store, e.g. in the form of an URL or even encrypted data in American Standard Code for Information Interchange (ASCII) or binary format. In an embodiment, the SIP registration message is REGISTER message of the SIP. Below, an embodiment of the REGISTER message with the information element and the resource locator.

accessible to all network operators, the authentication server or the network node may check a status of the subscriber associated with the biometric data and utilize the status in the one or more of the authentication, authorization, and accounting procedure. For example, if the status indicates that the subscriber has been blacklisted because of non-payment of bills or for some other reason, access of the subscriber to communication services may be prevented. For example, the connection establishment by the network node in the FIG. 5 may be terminated in block 508 or 510. From another perspective, the embodiment enables globally applied policies, rules, or features for each subscriber because the biometric data is globally unique to the subscriber and accessible to all networks in the reference database 146.

The use of the biometric data in the authentication generally improves the security of the wireless access.

```
REGISTER sip:test.3gpp.com SIP/2.0
From: <sip:+11234567890@test.3gpp.com>;tag=3671736441
To: <sip:+11234567890@test.3gpp.com>
CSeq: 450510775 REGISTER
Call-ID: 3671736255_186872264@2001:0:0:1::3
Via: SIP/2.0/UDP [2001:0:0:1::3]:5060;branch=z9hG4bK788602866
Max-Forwards: 70
Contact: <sip:+11234567890@[2001:0:0:1::3]:5060>;
            reg-id=1;
            +g.3gpp.icsi-ref="urn%3Aurn-7%3A3gpp-service.ims.icsi.mmtel";
            +g.3gpp.csi.smsip
Route: <sip:[2001:0:0:1::2]:5060;lr>
P-Access-Network-Info:        3GPP-E-UTRAN-FDD;        utran-cell-id-
3gpp=0010100010000000
Content-Length: 0
Authorization: Digest, Biometric
username="001010123456789@test.3gpp.com",
            realm="test.3gpp.com",uri="sip:test.3gpp.com", qop=auth,
            nonce="DtIe00txvoZUGvYmjgX98eAPJNjx3IAADsM84A8kWPE=",
            nc=00000001,
            cnonce="3671736221",
            algorithm=AKAv1-MD5,
            response="013e2a5d762d4d86e56112c0d41379f5",
            opaque="3c45b78d08f348459596ea2f6d316a42"
            biometric="https://central database server url/xxxxx.jpg"
Expires: 7200
Supported: path
Allow:
INVITE,BYE,CANCEL,ACK,NOTIFY,UPDATE,REFER,PRACK,INFO,MESSAGE,OPTIONS
```

The information element is "Authorization: Digest, Biometric", and the resource locator is "biometric="https://central database server url/xxxxx.jpg"" part of a session description protocol (SDP) body of the SIP.

Upon receiving the SIP registration message in step 900, the proxy server may retrieve in block 902 the biometric data from the network resource indicated by the received resource locator. The proxy server may also retrieve the reference biometric data, as described above. In this case, the user credentials required for retrieving the correct reference biometric data may also be included in the SIP registration message. For example, in the above-described REGISTER message, the username parameter ("001010123456789@test.3gpp.com") may be used when accessing the repository storing the reference biometric data. Thereafter, the proxy server may compare the biometric data with the reference biometric data in the above-described manner and determine the authentication result in block 904. The authentication result may be transmitted to the user agent in step 906.

Figure 11:
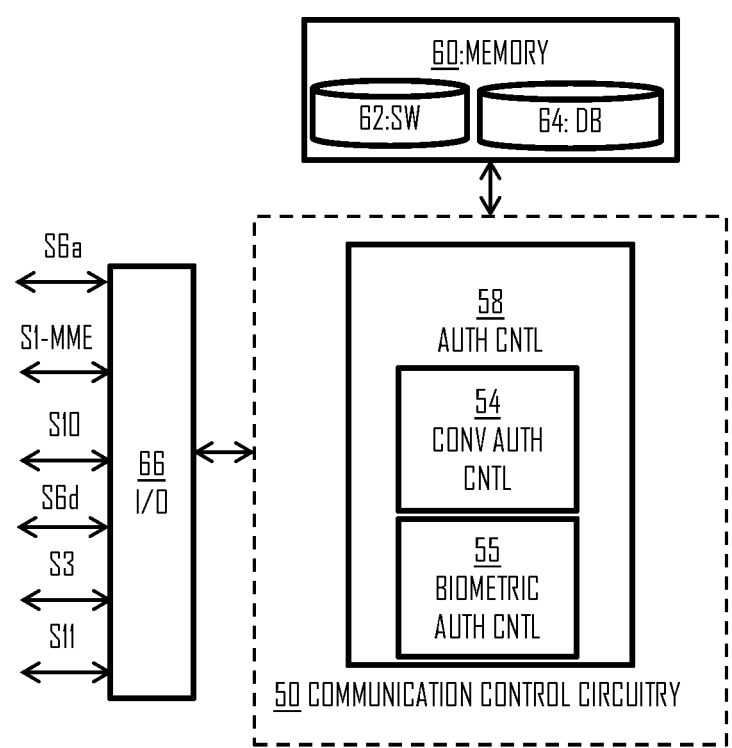

In an embodiment where the biometric data stored in the HSS or in the 142 and/or in the reference database is FIGS. 10 and 11 illustrate block diagrams of apparatuses according to some embodiments of the invention. FIG. 10 illustrates the station 120 while FIG. 9 illustrates the network node. The apparatus of FIG. 10 may be a terminal device or a peer device, or the apparatus may be comprised in any one of such apparatuses. The apparatus may be, for example, a circuitry or a chipset in such an apparatus. The apparatus of FIG. 11 may be the MME or another network node controlling authentication procedures, or the apparatus may be comprised in such an apparatus. The apparatus may be, for example, a circuitry or a chipset in such an apparatuses. The apparatuses of FIGS. 10 and 11 may be electronic devices comprising electronic circuitries.

Referring to FIG. 10, the apparatus may comprise a communication control circuitry 10 such as at least one processor, and at least one memory 20 including a computer program code (software) 22 wherein the at least one memory and the computer program code (software) are configured, with the at least one processor, to cause the apparatus to carry out any one of the embodiments of the station 120 described above.

The memory 20 may be implemented using any suitable data storage technology, such as semiconductor based memory devices, flash memory, magnetic memory devices and systems, optical memory devices and systems, fixed memory and removable memory. The memory may comprise a configuration database 24 for storing configuration data for use in the transmissions. For example, the configuration database 24 may store information on whether or not the biometric authentication is supported.

The apparatus may further comprise a communication interface (TX/RX) 26 comprising hardware and/or software for realizing communication connectivity according to one or more communication protocols. The communication interface 26 may provide the apparatus with communication capabilities to communicate in a cellular communication system and/or in another wireless network. Depending on whether the apparatus is configured to operate as a terminal device, a peer device, or another device, the communication interface 26 may provide different functions. The communication interface 26 may comprise standard well-known components such as an amplifier, filter, frequency-converter, (de)modulator, and encoder/decoder circuitries and one or more antennas. The communication interface 26 may comprise radio interface components providing the apparatus with radio communication capability in one or more wireless networks.

In an embodiment, the apparatus further comprises a scanner 15 for scanning or recording the biometric data from the user. The scanner may be a retinal scanner, a fingerprint scanner, or a voice recorder. The scanned biometric data may be stored in the memory 20 and transferred to the wireless access network in any one of the above-described embodiments.

Referring to FIG. 10, the communication control circuitry 10 may comprise a control plane circuitry 12 configured to carry out control plane signalling such as transmission and reception of control or management messages. Such messages may include connection establishment messages, connection management messages, connection termination messages, handover messages, measurement messages, etc. The control plane circuitry may, for example, carry out the signalling according to the embodiments of the RRC connection establishment described above. The communication control circuitry 10 may further comprise a data communication circuitry 16 configured to carry out user plane or data plane communication with a serving access node and/or with other devices.

The communication control circuitry 10 may further comprise a transmission controller 18 configured to control the operation of the circuitries 12 and 16. In an embodiment, upon determining to initiate establishment of the RRC connection, e.g. upon receiving a connection establishment request from an application executed in the apparatus, the transmission controller 18 may check the configuration database for whether or not the biometric authentication is enabled. If the configuration database 24 indicates that the biometric authentication is enabled, the transmission controller 18 may configure the control plane circuitry to insert the information element indicating the capability for the biometric authentication in the RRC connection request message. On the other hand, if the configuration database 24 indicates that the biometric authentication is disabled, the transmission controller 18 may configure the control plane circuitry 12 to transmit a conventional RRC connection request message.

Referring to FIG. 11, the apparatus may comprise a communication control circuitry 50 such as at least one processor, and at least one memory 60 including a computer program code (software) 62 wherein the at least one memory and the computer program code (software) are configured, with the at least one processor, to cause the apparatus to carry out any one of the embodiments of the network node controlling the authentication, authorization, and/or accounting as described above.

The memory 60 may be implemented using any suitable data storage technology, such as semiconductor based memory devices, flash memory, magnetic memory devices and systems, optical memory devices and systems, fixed memory and removable memory. The memory may comprise a configuration database 64 for storing configuration data. For example, the configuration database 64 may store information on whether or not the network node supports the biometric authentication.

The apparatus may further comprise a communication interface (I/O) 66 comprising hardware and/or software for realizing communication connectivity according to one or more communication protocols. The communication interface 66 may provide the apparatus with communication capabilities to communicate in the cellular communication system and/or in another wireless access network. The communication interface may, for example, provide an interface to access nodes of the wireless access network and another interface towards the HSS or another entity storing the biometric data. The communication interface 66 may further provide an interface to the authentication server. FIG. 11 illustrates some interfaces of the MME 132 towards other network nodes but these interfaces are merely exemplary.

Referring to FIG. 11, the communication control circuitry 50 may comprise an authentication controller 58 configured to control the authentication of the subscriber in connection with establishing the connection for the station 120. The authentication controller may comprise, as a sub-circuitry, a conventional authentication controller 54 configured to perform the authentication in a conventional manner without using the biometric data. The authentication controller 58 may enable the conventional authentication controller 54 when the configuration database 64 indicates that the biometric authentication is not supported. The authentication controller may comprise, as a sub-circuitry, a biometric authentication controller 55 configured to perform the authentication by using the biometric data. The authentication controller 58 may enable the biometric authentication controller 55 when the configuration database 64 indicates that the biometric authentication is supported. The biometric authentication controller may perform blocks 508 and 510 according to any one of the above-described embodiments.

As used in this application, the term 'circuitry' refers to all of the following: (a) hardware-only circuit implementations, such as implementations in only analog and/or digital circuitry, and (b) combinations of circuits and software (and/or firmware), such as (as applicable): (i) a combination of processor(s) or (ii) portions of processor(s)/software including digital signal processor(s), software, and memory(ies) that work together to cause an apparatus to perform various functions, and (c) circuits, such as a microprocessor(s) or a portion of a microprocessor(s), that require software or firmware for operation, even if the software or firmware is not physically present. This definition of 'circuitry' applies to all uses of this term in this application. As a further example, as used in this application, the term 'circuitry' would also cover an implementation of merely a processor (or multiple processors) or a portion of a processor and its (or their) accompanying software and/or firmware. The term 'circuitry' would also cover, for example and if applicable to the particular element, a baseband integrated circuit or applications processor integrated circuit for a mobile phone or a similar integrated circuit in a server, a cellular network device, or another network device.

The techniques and methods described herein may be implemented by various means. For example, these techniques may be implemented in hardware (one or more devices), firmware (one or more devices), software (one or more modules), or combinations thereof. For a hardware implementation, the apparatus(es) of embodiments may be implemented within one or more application-specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described herein, or a combination thereof. For firmware or software, the implementation can be carried out through modules of at least one chipset (e.g. procedures, functions, and so on) that perform the functions described herein. The software codes may be stored in a memory unit and executed by processors. The memory unit may be implemented within the processor or externally to the processor. In the latter case, it can be communicatively coupled to the processor via various means, as is known in the art. Additionally, the components of the systems described herein may be rearranged and/or complemented by additional components in order to facilitate the achievements of the various aspects, etc., described with regard thereto, and they are not limited to the precise configurations set forth in the given figures, as will be appreciated by one skilled in the art.

Embodiments as described may also be carried out in the form of a computer process defined by a computer program or portions thereof. Embodiments of the methods described in connection with FIGS. 2 to 7 may be carried out by executing at least one portion of a computer program comprising corresponding instructions. The computer program may be in source code form, object code form, or in some intermediate form, and it may be stored in some sort of carrier, which may be any entity or device capable of carrying the program. For example, the computer program may be stored on a computer program distribution medium readable by a computer or a processor. The computer program medium may be, for example but not limited to, a record medium, computer memory, read-only memory, electrical carrier signal, telecommunications signal, and software distribution package, for example. The computer program medium may be a non-transitory medium. Coding of software for carrying out the embodiments as shown and described is well within the scope of a person of ordinary skill in the art.

Even though the invention has been described above with reference to an example according to the accompanying drawings, it is clear that the invention is not restricted thereto but can be modified in several ways within the scope of the appended claims. Therefore, all words and expressions should be interpreted broadly and they are intended to illustrate, not to restrict, the embodiment. It will be obvious to a person skilled in the art that, as technology advances, the inventive concept can be implemented in various ways. Further, it is clear to a person skilled in the art that the described embodiments may, but are not required to, be combined with other embodiments in various ways.

The invention claimed is:

1. A method comprising:
   receiving, by a network node of a wireless access network, a connection establishment request for connection establishment for a station, wherein the connection establishment request comprises at least one information element indicating whether or not the station has capability of using biometric data of a user of the station in an authentication procedure of the connection establishment, wherein the at least one information element indicates a network resource storing the biometric data of a user of the station, the biometric data stored beforehand in the network resource and being for comparison with reference biometric data of the user in the authentication procedure;
   as a response to the information element indicating that the station has the capability of using biometric data in the authentication procedure, performing the following by the network node:
   retrieving, by the network node, the biometric data of the user from the determined network resource;
   transmitting, by the network node to an authentication node having access to reference database storing reference biometric data of the user, an authentication request to authenticate the retrieved or received biometric data; and
   receiving, by the network node from the authentication node as a response to the authentication request, an authentication result; and
   as a response to the information element indicating that the station does not have the capability of using biometric data in the authentication procedure, performing by the network node a non-biometric-data-based authentication procedure and acquiring an authentication result; and
   proceeding, by the network node, with the connection establishment for the station on the basis of the authentication result.

2. The method of claim 1, wherein the network resource is a home subscriber server of the station.

3. The method of claim 1, wherein said retrieving comprises:
   transmitting, by the network node, an authentication data request comprising an information element explicitly indicating that the network node requests for the biometric data for the authentication; and
   receiving, by the network node from the network resource as a response to the authentication data request, the biometric data in one or more messages.

4. The method of claim 3, further comprising as performed by the network node:
   upon receiving the biometric data, determining that further biometric data is needed from the network resource;
   in response to said determining that further biometric data is needed from the network resource, transmitting a request for further biometric data to the network resource; and
   as a response to the request for further biometric data, receiving from the network resource said further biometric data.

5. The method of claim 1, wherein said retrieving the biometric data from the determined network resource is carried out according to Diameter protocol.

6. An apparatus for a network node of a wireless access network, comprising:
   at least one processor, and
   at least one memory including a computer program code, wherein the at least one memory and the computer program code are configured, with the at least one processor, to cause the apparatus to:

receive a connection establishment request for connection establishment for a station, wherein the connection establishment request comprises at least one information element indicating whether or not the station has capability of using biometric data of a user of the station in an authentication procedure of the connection establishment, wherein the at least one information element indicates a network resource storing the biometric data of a user of the station, the biometric data stored beforehand in the network resource and being for comparison with reference biometric data of the user in the authentication procedure;

as a response to the information element indicating that the station has the capability of using biometric data in the authentication procedure, performing the following:

retrieving the biometric data of the user from the determined network resource;

transmitting, to an authentication node having access to reference database storing reference biometric data of the user, an authentication request to authenticate the retrieved biometric data;

receiving, from the authentication node as a response to the authentication request, an authentication result;

as a response to the information element indicating that the station does not have the capability of using biometric data in the authentication procedure, perform a non-biometric-data-based authentication procedure and acquire an authentication result; and proceed with the connection establishment for the station based upon the authentication result.

7. The apparatus of claim 6, wherein the network resource is a home subscriber server of the station.

8. The apparatus of claim 6, wherein the at least one memory and the computer program code are configured, with the at least one processor, to cause the apparatus to perform said retrieval by:

transmitting an authentication data request comprising an information element explicitly indicating that the network node requests for the biometric data for the authentication; and receiving, from the network resource as a response to the authentication data request, the biometric data in one or more messages.

9. The apparatus of claim 8, wherein the at least one memory and the computer program code are configured, with the at least one processor, to cause the apparatus to:

upon receiving the biometric data, determine that further biometric data is needed from the network resource;

in response to said determining that further biometric data is needed from the network resource, transmit a request for further biometric data to the network resource; and as a response to the request for further biometric data, receive from the network resource said further biometric data.

10. The apparatus of claim 6, wherein the at least one memory and the computer program code are configured, with the at least one processor, to cause the apparatus to retrieve the biometric data from the determined network resource according to Diameter protocol.

11. A system comprising:

an apparatus for a station as a first apparatus, comprising:

at least one processor, and at least one memory including a computer program code, wherein the at least one memory and the computer program code are configured, with the at least one processor, to cause the first apparatus to:

generate a connection establishment request comprising at least one information element indicating whether or not the station has capability of using biometric data in an authentication procedure in a wireless access network, wherein the at least one information element indicates a network resource storing the biometric data of a user of the station, the biometric data stored beforehand in the network resource and being for comparison with reference biometric data of the user in the authentication procedure;

cause transmission of the connection establishment request from the station to a network node of the wireless access network; and perform, as a response to indicating the capability of using biometric data in the authentication procedure, the authentication procedure based on the biometric data; and perform, as a response to indicating that the station does not have the capability of using biometric data in the authentication procedure, a non-biometric-data-based authentication procedure; and a second apparatus, for the network node of the wireless access network, said second apparatus comprising:

at least one other processor; and at least one other memory including other computer program code, wherein the at least one other memory and the other computer program code are configured, with the at least one other processor, to cause the second apparatus to receive the connection establishment request for connection establishment for the station;

as a response to the information element indicating that the station has the capability of using biometric data in the authentication procedure, performing the following:

retrieving the biometric data of the user from the determined network resource;

transmitting, to the network node, an authentication request to authenticate the retrieved biometric data; and receiving, from the network node as a response to the authentication request, the authentication result; and as a response to the information element indicating that the station does not have the capability of using biometric data in the authentication procedure, perform a non-biometric-data-based authentication procedure and acquire an authentication result; and proceed with the connection establishment for the station based upon the authentication result.

12. A computer program product embodied on a non-transitory computer-readable medium, said computer program product readable by a computer of a network node of a wireless access network and, when executed by the computer, configured to cause the computer to execute a computer process comprising a method, the method comprising:

receiving a connection establishment request for connection establishment for a station, wherein the connection establishment request comprises at least one information element indicating whether or not the station has capability of using biometric data of a user of the station in an authentication procedure of the connection establishment, wherein the at least one information element indicates a network resource storing the biometric data of a user of the station, the biometric data stored beforehand in the network resource and being for comparison with reference biometric data of the user in the authentication procedure;

as a response to the information element indicating that the station has the capability of using biometric data in the authentication procedure, performing the following by the computer:

retrieving the biometric data of the user from the determined network resource;

transmitting, to an authentication node having access to reference database storing reference biometric data of the user, an authentication request to authenticate the retrieved or received biometric data; and receiving, from the authentication node as a response to the authentication request, an authentication result; and as a response to the information element indicating that the station does not have the capability of using biometric data in the authentication procedure, performing a non-biometric-data-based authentication procedure and acquiring an authentication result; and proceeding with the connection establishment for the station on the basis of the authentication result.

* * * * *